United States Patent
Shi et al.

(10) Patent No.: US 12,019,273 B2
(45) Date of Patent: Jun. 25, 2024

(54) METHOD FOR PREVENTING FEEDBACK LIGHT OF A LASER

(71) Applicant: WUHAN RAYCUS FIBER LASER TECHNOLOGIES CO., LTD., Hubei (CN)

(72) Inventors: Jianhong Shi, Hubei (CN); Dapeng Yan, Hubei (CN); Cheng Li, Hubei (CN); Sha Li, Hubei (CN); Haowei Hu, Hubei (CN); Jianming Wang, Hubei (CN); Ming Chen, Hubei (CN)

(73) Assignee: WUHAN RAYCUS FIBER LASER TECHNOLOGIES CO., LTD., Wuhan (CN)

( * ) Notice: Subject to any disclaimer, the term of this patent is extended or adjusted under 35 U.S.C. 154(b) by 671 days.

(21) Appl. No.: 17/138,878

(22) Filed: Dec. 30, 2020

(65) Prior Publication Data
US 2021/0149113 A1    May 20, 2021

Related U.S. Application Data

(63) Continuation of application No. PCT/CN2020/114380, filed on Sep. 10, 2020.

(30) Foreign Application Priority Data

Oct. 24, 2019  (CN) .......... 201911019259.X

(51) Int. Cl.
*G02B 6/255* (2006.01)
*B23K 26/21* (2014.01)
(Continued)

(52) U.S. Cl.
CPC .......... *G02B 6/2551* (2013.01); *B23K 26/21* (2015.10); *H01S 3/0064* (2013.01); *H01S 3/06716* (2013.01)

(58) Field of Classification Search
CPC ..... G02B 6/2551; B23K 26/21; H01S 3/0064; H01S 3/06716; H01S 3/067
See application file for complete search history.

(56) References Cited

U.S. PATENT DOCUMENTS

| 6,424,765 B1 | 7/2002 | Harker |
| 9,645,322 B2 | 5/2017 | Murashima |

(Continued)

FOREIGN PATENT DOCUMENTS

| CN | 105403954 | 3/2016 |
| CN | 105744896 | 7/2016 |
| CN | 110768089 | 2/2020 |

*Primary Examiner* — Robert G Bachner
(74) *Attorney, Agent, or Firm* — MORRISS O'BRYANT COMPAGNI CANNON, PLLC

(57) ABSTRACT

A method for preventing feedback light of a laser, includes fusion-splicing a target fiber to an output fiber of a laser, so that laser lights generated by the laser are output from the target fiber. A refractive index of a core of the output fiber of the laser is less than a refractive index of a core of the target fiber. When a feedback light of a laser light of the laser is reversely transmitted to a fusion-splicing surface through the target fiber, total reflection occurs due to a refractive index difference on the fusion-splicing surface, so that the feedback light is transmitted along the transmission direction of the laser light, and is prevented from entering the output fiber along the reverse direction of the laser light and further entering the laser's resonant cavity to damage the laser component or burn out the gain fiber.

7 Claims, 2 Drawing Sheets

(51) Int. Cl.
*H01S 3/00* (2006.01)
*H01S 3/067* (2006.01)

(56) References Cited

U.S. PATENT DOCUMENTS

| | | |
|---|---|---|
| 2001/0047668 A1 | 12/2001 | Ochiai et al. |
| 2003/0147606 A1* | 8/2003 | Wang .................... C03B 37/016 385/123 |
| 2016/0320564 A1* | 11/2016 | Murashima .......... G01B 9/0205 |
| 2019/0196104 A1 | 6/2019 | Ghiringhelli |
| 2020/0226422 A1* | 7/2020 | Li ............................ G06N 3/08 |

* cited by examiner

METHOD FOR PREVENTING FEEDBACK LIGHT OF A LASER

CROSS-REFERENCE TO RELATED APPLICATIONS

This application is a continuation of PCT International Patent Application No. PCT/CN2020/114380 filed on Sep. 10, 2020 which claims priority to Chinese Application No. 201911019259X filed on Oct. 24, 2019, titled "Method for Preventing Feedback Light of a Laser," each of which is hereby incorporated by reference in its entirety.

FIELD OF TECHNOLOGY

The present application relates to the technical field of fiber optic communication, and more particularly, to a method for preventing feedback light of a laser.

BACKGROUND

High-power fiber optic equipment usually refers to fiber optic equipment with an output power greater than or equal to 100 W, and can include, for example, high-power fiber amplifiers.

Currently, high-power fiber lasers are typically set to tilt the end face of the fiber at an 8-degree angle when using the fiber to transmit laser light in order to increase the return loss, namely, to reduce the feedback light transmitted along the reverse direction. For the output of medium- and high-power laser, the end-cap structure connected with the laser output terminal of the fiber can also be improved by making a serrated grain on the surface of the end cap cone part of the end-cap structure to break the smooth interface between the cone surface and the air, so that the feedback light propagated to this interface either fails to be fully reflected or is severely deviated when passing through the cone surface, thus reducing the coupling of the feedback light into the fiber.

However, the principle of reducing the feedback light in the above-mentioned methods is to deviate the transmission direction of the feedback light from the original transmission direction, so that the feedback light cannot continue to be transmitted in the core, and the feedback light cannot be fully utilized, resulting in a waste of resources. Therefore, there is an urgent need to provide a method for preventing feedback light of a laser.

SUMMARY

In order to solve or at least partially solve the above-mentioned problems, embodiments of the present application provide a method for preventing feedback light of a laser.

An embodiment of the present application provides a method for preventing feedback light from a laser, the method including:

fusion-splicing a target fiber to an output fiber of a laser, so that laser lights generated by the laser are output from the target fiber;

wherein the refractive index of a core of the output fiber of the laser is less than the refractive index of a core of the target fiber.

In an embodiment, the diameter of the core of the output fiber of the laser is smaller than the diameter of the core of the target fiber.

In an embodiment, the diameter of the core of the output fiber of the laser is 20 μm, and the diameter of the core of the target fiber is 50 μm.

In an embodiment, the core of the output fiber of the laser is a silica core, and the core of the target fiber is a germanium-doped silica core or a phosphorus-doped silica core.

In an embodiment, the core of the output fiber of the laser is a fluorine-doped silica core, and the core of the target fiber is a silica core.

In an embodiment, the core of the output fiber of the laser is a fluorine-doped silica core, and the core of the target fiber is a germanium-doped silica core or a phosphorus-doped silica core.

In an embodiment, the core central axis of the output fiber of the laser is collinear with the core central axis of the target fiber.

The method for preventing feedback light of a laser according to the embodiments of the present application includes: fusion-splicing a target fiber to an output fiber of a laser, so that laser lights generated by the laser are output from the target fiber, wherein the refractive index of the core of the output fiber of the laser is less than the refractive index of the core of the target fiber. When a feedback light of a laser light generated by the laser is reversely transmitted to a fusion-splicing surface of the output fiber and the target fiber through the target fiber, total reflection occurs due to refractive index difference on the fusion-splicing surface, so that the feedback light is transmitted along the transmission direction of the laser light, and is prevented from entering the output fiber along the reverse direction of the laser light and further entering the laser's resonant cavity to damage the laser component or burn out the gain fiber, so that the normal operation of the laser's internal components and the laser is ensured.

BRIEF DESCRIPTION OF THE DRAWINGS

In order to make the technical solutions in the embodiments of the present application or the prior art clearer, drawings needed in the embodiments or the description of the prior art is briefly introduced as follows. Obviously, the drawings in the following description are only some of the embodiments of the present application. For those of ordinary skill in the art, other drawings can be obtained based on these drawings without paying any creative effort.

DETAILED DESCRIPTION

Figure 1:
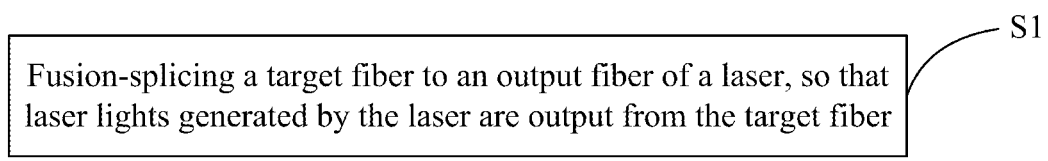
FIG. 1 is a schematic flowchart of a method for preventing feedback light of a laser according to an embodiment of the present application.

In order to specify the objectives, technical solutions and advantages of the embodiments of the present application, the technical solutions in the embodiments of the present application will be described clearly and completely in conjunction with the accompanying drawings in the embodiments of the present application. Obviously, the embodiments described below are part of the embodiments of the present application, rather than all of the embodiments. Based on the embodiments in the present application, all other embodiments obtained by those of ordinary skill in the art without creative effort shall fall within the protection scope of the present application.

With respect to the description of the embodiments of the present application, it should be noted that the orientation or positional relationship indicated by the terms such as "center," "upper," "lower," "left," "right," "vertical," "horizontal," "inner," and "outer" is based on the orientation or positional relationship shown in the drawings, the purpose of which is only to facilitate describing the embodiments of present application and simplify the description, rather than to indicate or imply that the device or element referred to must have a specific orientation, be constructed and operated in a specific orientation, and therefore cannot be construed as a limitation of the embodiments of the present application. In addition, the terms "first," "second," and "third" are for descriptive purpose only, and cannot be understood as indicating or implying the relative importance.

With respect to the description of the embodiments of the present application, it should be noted that unless otherwise clearly specified or defined, the terms "install," "connect with," and "connect to" should be understood in a broad sense, for example, it can be a fixed connection or a detachable connection, or an integral connection; it can be mechanically or electrically connected, directly connected or indirectly connected through an intermediary, or can be a connection within two components. For those of ordinary skill in the art, the specific meaning of the above terms in the embodiments of the present application can be understood according to the specific situations.

As shown in FIG. 1, an embodiment of the present application provides a method for preventing feedback light of a laser, the method including: S1, fusion-splicing a target fiber to an output fiber of a laser, so that laser lights generated by the laser are output from the target fiber;

wherein the refractive index of a core of the output fiber of the laser is less than the refractive index of a core of the target fiber.

Figure 2:
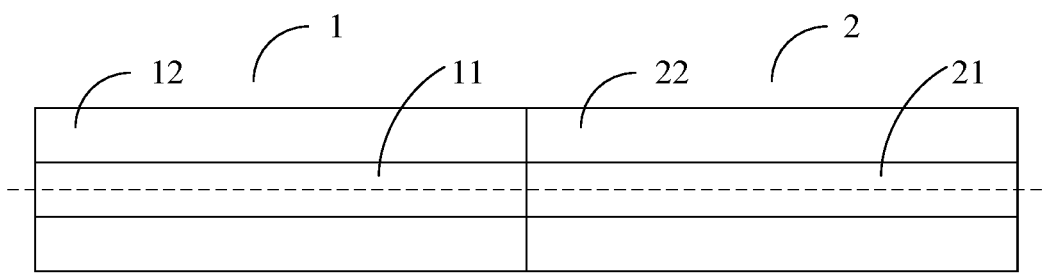
FIG. 2 is a schematic structural diagram of fiber fusion splicing in a method for preventing feedback light of a laser according to an embodiment of the present application.

Specifically, as shown in FIG. 2 which is a schematic structural diagram of fiber fusion splicing in a method for preventing feedback light of a laser according to an embodiment of the present application, a target fiber 2 is fusion-spliced to an output fiber 1 of a laser, so that laser lights generated by the laser are output from the target fiber 2. Wherein the output fiber 1 of the laser includes a core 11 and a cladding 12, and the target optical fiber 2 includes a core 21 and a cladding 22. During fusion splicing, the central axis of the core 11 of the output fiber 1 of the laser is collinear with the central axis of the core 21 of the target fiber 2, that is, both coincide, as shown by the dashed line in FIG. 2. Also, the end faces of the output fiber 1 of the laser and the target fiber 2 fusion-spliced to each other are parallel, and the end faces may be perpendicular to the central axis. It should be noted that the diameter of the core 11 of the output fiber 1 of the laser and the diameter of the core 21 of the target fiber 2 in the embodiment of the present application may be equal or unequal, which is not specifically defined in the embodiment of the present application. For example, the diameter of the core 11 of the output fiber 1 of the laser may be smaller than or equal to the diameter of the core 21 of the target fiber 2.

The refractive index of the core 11 of the output fiber 1 of the laser is less than the refractive index of the core 21 of the target fiber 2, and thus it can be transmitted normally either in the core 11 or in the core 21 when the laser light generated by the laser is forwardly transmitted in the core along the direction from the output fiber 1 to the target fiber 2. However, when the feedback light of the laser light is backwardly transmitted in the core along the direction from the target fiber 2 to the output fiber 1, since the refractive index of the core 11 of the output fiber 1 is less than the refractive index of the core 21 of the target fiber 2, the feedback light of the laser light will be totally reflected as it is transmitted in the core 11 to the fusion splice of the output fiber 1 and the target fiber 2, so that the feedback light of the laser light is transmitted along the transmission direction of the laser light, and is prevented from entering the output fiber along the reverse direction of the laser light and further entering the laser's resonant cavity to damage the laser component or burn out the gain fiber.

The method for preventing feedback light of a laser according to the embodiments of the present application includes: fusion-splicing a target fiber to an output fiber of a laser, so that laser lights generated by the laser are output from the target fiber, wherein the refractive index of the core of the output fiber of the laser is less than the refractive index of the core of the target fiber. When a feedback light of a laser light generated by the laser is reversely transmitted to a fusion-splicing surface of the output fiber and the target fiber through the target fiber, total reflection occurs due to refractive index difference on the fusion-splicing surface, so that the feedback light is transmitted along the transmission direction of the laser light, and is prevented from entering the output fiber along the reverse direction of the laser light and further entering the laser's resonant cavity to damage the laser component or burn out the gain fiber, and thus the normal operation of the laser's internal components and the laser is ensured.

Figure 3:
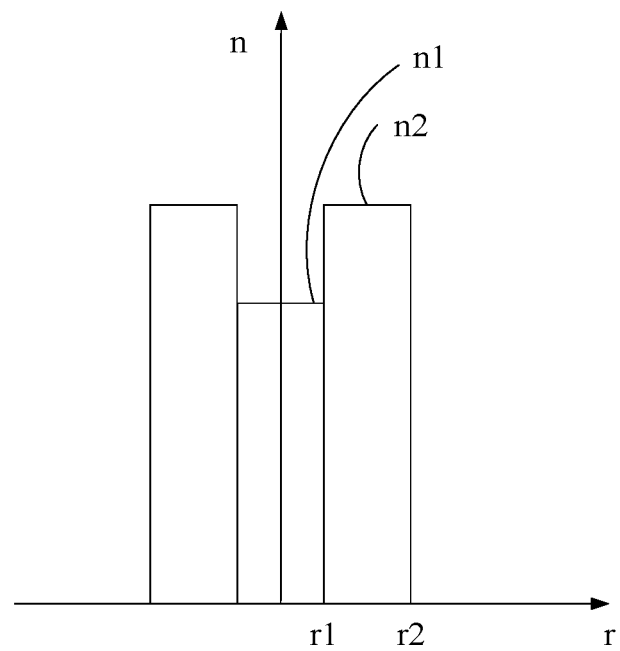
FIG. 3 is a schematic diagram of the cross-sectional refractive index distribution at the fusion splice of the output fiber and the target fiber in a method for preventing feedback light of a laser according to an embodiment of the present application.

As shown in FIG. 3 which is a schematic diagram of the cross-sectional refractive index distribution at the fusion splice of the output fiber and the target fiber in a method for preventing feedback light of a laser according to an embodiment of the present application, r1 is the diameter of a core of the output fiber, n1 is the refractive index of the core of the output fiber, r2 is the diameter of the core of the target fiber, and n2 is the refractive index of the core of the target fiber.

On the basis of the foregoing embodiment, in the method for preventing feedback light of a laser according to an embodiment of the present application, the diameter of the core of the output fiber of the laser is smaller than the diameter of the core of the target fiber.

Figure 4:
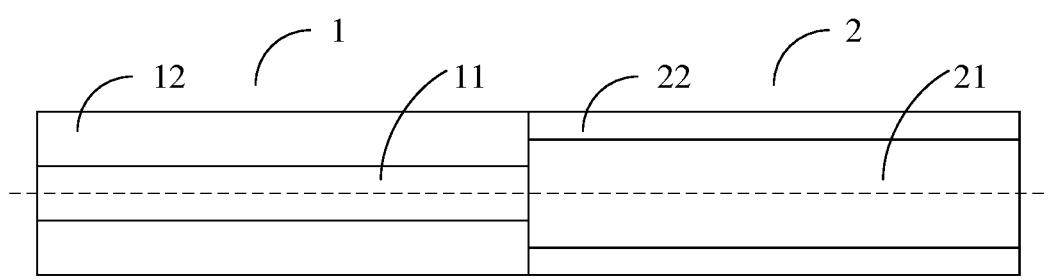
FIG. 4 is a schematic structural diagram of fiber fusion splicing in a method for preventing feedback light of a laser according to an embodiment of the present application.

Specifically, as shown in FIG. 4 which is a schematic structural diagram of fiber fusion splicing in a method for preventing feedback light from a laser according to an embodiment of the present application, the diameter of the core 11 of the output fiber 1 of the laser is smaller than the diameter of the core 21 of the target fiber 2. In this way, the laser light can be transmitted normally when it is transmitted along the transmission direction from the output fiber 1 of the laser to the target fiber 2. However, when the feedback light of the laser light is transmitted along the reverse direction from the target fiber 2 to the output fiber 1 of the laser, on the one hand, total reflection will occur as the feedback light of the laser light is transmitted to the fusion splice of the output fiber 1 of the laser and the target fiber 2, causing the feedback light of the laser light to be transmitted along the transmission direction of the laser light; on the other hand, a small amount of incompletely totally reflected feedback light will leak into the cladding of the output fiber of the laser at the fusion splice, and the feedback light leaked into the cladding will be dissipated and can no longer be transmitted backwards.

On the basis of the foregoing embodiments, a high-refractive-index adhesive can also be applied at the fusion splice after the output fiber has been fusion-spliced to the target fiber to filter out a small amount of the remaining feedback light, wherein the refractive index of the high-refractive-index adhesive is greater than the refractive index of the cladding of the target fiber or the output fiber.

On the basis of the foregoing embodiments, the laser can also include a mode stripper. The output fiber of the laser can be a pigtail of the mode stripper, and the mode stripper can filter out a part of the feedback light.

On the basis of the foregoing embodiments, in the method for preventing feedback light of a laser according to an embodiment of the present application, the diameter of the core of the output fiber of the laser is 20 μm, and the diameter of the core of the target fiber is 50 μm.

Specifically, in an embodiment of the present application, the diameter of the core of the output fiber of the laser is specifically set to 20 μm, and the diameter of the core of the target fiber is specifically set to 50 μm.

On the basis of the foregoing embodiments, in the method for preventing feedback light of a laser according to an embodiment of the present application, the core of the output fiber of the laser is a silica core, and the core of the target fiber is a germanium-doped silica core or a phosphorus-doped silica core.

Specifically, in an embodiment of the present application, in order to make the refractive index of the core of the output fiber of the laser less than the refractive index of the core of the target fiber, the core of the output fiber of the laser may be a silica core, that is, the core of the output fiber of the laser is made of silica. The core of the target fiber can be doped with elements such as germanium or phosphorus, that is, the core of the target fiber is a germanium-doped silica core or a phosphor-doped silica core, resulting in a larger refractive index of the core of the target fiber.

On the basis of the foregoing embodiments, in the method for preventing feedback light of a laser according to an embodiment of the present application, the core of the output fiber of the laser is a fluorine-doped silica core, and the core of the target fiber is a silica core.

Specifically, in an embodiment of the present application, in order to make the refractive index of the core of the output fiber of the laser less than the refractive index of the core of the target fiber, the core of the target fiber may be a silica core, that is, the core of the target fiber is made of silica. The core of the output fiber of the laser can be doped with elements such as fluorine, that is, the core of the output fiber of the laser is a fluorine-doped silica core, resulting in a smaller refractive index of the core of the output fiber of the laser.

On the basis of the foregoing embodiments, in the method for preventing feedback light of a laser according to an embodiment of the present application, the core of the output fiber of the laser is a fluorine-doped silica core, and the core of the target fiber is a germanium-doped silica core or a phosphorus-doped silica core.

Specifically, in an embodiment of the present application, in order to make the refractive index of the core of the output fiber of the laser less than the refractive index of the core of the target fiber, the refractive index of the core of the target fiber can be increased accordingly, that is, the fluorine-doped silica core is used as the core of the output fiber of the laser, and the germanium-doped silica core or phosphor-doped silica core is used as the core of the target fiber to reduce the refractive index of the core of the output fiber of the laser.

It should be noted that the embodiments are only for illustrating the technical solutions of the present application, rather than limiting them; although the present application has been described in detail with reference to the foregoing embodiments, those skilled in the art should understand that the technical solutions documented in the preceding embodiments may still be modified, or parts of the technical features thereof can be equivalently substituted; and such modifications or substitutions do not deviate from scope of the technical solutions of the embodiments of the present application.

The invention claimed is:

1. A method for preventing feedback light of a laser, the method comprising:
    fusion-splicing a target fiber to an output fiber of a laser, so that laser lights generated by the laser are output from the target fiber;
    wherein a first core refractive index of the output fiber of the laser is a first constant value, a second core refractive index of the target fiber of the laser is a second constant value, and the first core refractive index of the output fiber of the laser is less than the second core refractive index of the target fiber.

2. The method for preventing feedback light of a laser of claim 1, wherein a first diameter of a first core of the output fiber of the laser is smaller than a second diameter of a second core of the target fiber.

3. The method for preventing feedback light of a laser of claim 2, wherein the first diameter of the first core of the output fiber of the laser is 20 μm, and the second diameter of the second core of the target fiber is 50 μm.

4. The method for preventing feedback light of a laser of claim 1, wherein the first core of the output fiber of the laser is a silica core, and the second core of the target fiber is a germanium-doped silica core or a phosphorus-doped silica core.

5. The method for preventing feedback light of a laser of claim 1, wherein the first core of the output fiber of the laser is a fluorine-doped silica core, and the second core of the target fiber is a silica core.

6. The method for preventing feedback light of a laser of claim 1, wherein the first core of the output fiber of the laser is a fluorine-doped silica core, and the second core of the target fiber is a germanium-doped silica core or a phosphorus-doped silica core.

7. The method for preventing feedback light of a laser of claim 1, wherein a first core central axis of the output fiber of the laser is collinear with a second core central axis of the target fiber.

* * * * *